US012763313B2

(12) United States Patent

Xie et al.

(10) Patent No.: US 12,763,313 B2

(45) Date of Patent: Oct. 13, 2026

(54) LITHIUM SUPPLEMENTING APPARATUS AND LITHIUM SUPPLEMENTING METHOD

(71) Applicant: Contemporary Amperex Technology (Hong Kong) Limited, Hong Kong (CN)

(72) Inventors: Bin Xie, Ningde (CN); Yi Lu, Ningde (CN); Chunhui Cai, Ningde (CN); Xinlu Fei, Ningde (CN); Shitong Chen, Ningde (CN); Keqiang Li, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 0 days.

(21) Appl. No.: 18/959,672

(22) Filed: Nov. 26, 2024

(65) Prior Publication Data

US 2025/0087659 A1 Mar. 13, 2025

Related U.S. Application Data

(63) Continuation of application No. PCT/CN2022/106832, filed on Jul. 20, 2022.

(51) Int. Cl.

| | |
|---|---|
| ***H01M 4/04*** | (2006.01) |
| ***H01M 10/04*** | (2006.01) |

(52) U.S. Cl.

CPC ..... *H01M 4/0435* (2013.01); *H01M 10/0431* (2013.01)

(58) Field of Classification Search

CPC ........................ H01M 4/0435; H01M 10/0431

See application file for complete search history.

(56) References Cited

FOREIGN PATENT DOCUMENTS

| | | | |
|---|---|---|---|
| CN | 105845896 | A | 8/2016 |
| CN | 105845897 | A | 8/2016 |
| CN | 207558931 | U | 6/2018 |
| CN | 111519135 | A | 8/2020 |
| CN | 112310336 | A | 2/2021 |
| CN | 113889600 | A | 1/2022 |
| EP | 3933976 | A1 | 1/2022 |

(Continued)

OTHER PUBLICATIONS

The extended European search report received in the counterpart EP application 22951504.4, dated May 13, 2025, 8 pages.

(Continued)

*Primary Examiner* — Sarah A. Slifka

(74) *Attorney, Agent, or Firm* — K&L Gates LLP

(57) ABSTRACT

The present application provides a lithium supplementing apparatus and a lithium supplementing method, which can efficiently perform lithium supplementing on a battery. The lithium supplement apparatus includes: a plurality of calendering devices for respectively transferring lithium on a plurality of lithium strips to a plurality of first regions distributed on a coating device in a first direction, the first direction being a width direction of a first electrode plate to be subjected to lithium supplementing; the coating device for respectively coating the lithium of the plurality of first regions onto a plurality of second regions corresponding to the plurality of first regions on the first electrode plate; and a segmenting device for segmenting the first electrode plate according to the plurality of second regions, so as to form a plurality of segmented second electrode plates.

19 Claims, 9 Drawing Sheets

(56) References Cited

FOREIGN PATENT DOCUMENTS

| | | | |
|---|---|---|---|
| JP | 2010212143 | A | 9/2010 |
| WO | 2017/197753 | A1 | 11/2017 |

OTHER PUBLICATIONS

The international search report received in the counterpart international application PCT/CN2022/106832, mailed on Apr. 12, 2023.

LITHIUM SUPPLEMENTING APPARATUS AND LITHIUM SUPPLEMENTING METHOD

CROSS-REFERENCE TO RELATED APPLICATIONS

This application is a continuation of International Application No. PCT/CN2022/106832, filed on Jul. 20, 2022, the content of which is incorporated herein by reference in its entirety.

TECHNICAL FIELD

The present application relates to the field of battery technologies, in particular to a lithium supplementing apparatus and a lithium supplementing method.

BACKGROUND

Energy saving and emission reduction is a key to the sustainable development of the automotive industry. In this case, the electric vehicle becomes an important part the sustainable development of the automobile industry due to its advantages of energy saving and environmental protection. For the electric vehicle, the battery technology is another vital factor for its development.

In the development of battery technologies, battery performance is a considerable problem. The performance of the battery not only affects the development and application of battery-related products, but also the consumer acceptance of the electric vehicle. Generally, lithium supplementing can be performed on a battery, so as to supplement loss of active lithium during the use of the battery, thereby improving the service life of the battery; in addition, loss of active lithium during the first charging process of the battery can also be supplemented, thereby improving the energy density of the battery. Therefore, how to efficiently perform lithium supplementing on batteries becomes a problem to be solved.

SUMMARY

The present application provides a lithium supplementing apparatus and a lithium supplementing method, which can efficiently perform lithium supplementing on a battery.

In a first aspect, provided is a lithium supplementing apparatus, including: a plurality of calendering devices used for respectively transferring lithium on a plurality of lithium strips to a plurality of first regions distributed in a first direction on a coating device, the first direction being a width direction of a first electrode plate to be subjected to lithium supplementing; the coating device used for respectively coating lithium of the plurality of first regions on a plurality of second regions corresponding to the plurality of first regions on the first electrode plate; and a segmenting device used for segmenting the first electrode plate according to the plurality of second regions so as to form a plurality of segmented second electrode plates.

In the embodiments of the present application, by a plurality of calendering devices, lithium on a plurality of lithium strips is respectively transferred to a plurality of first regions distributed in the width direction of a electrode plate on a coating device at the same time, and the lithium in the plurality of first regions is transferred to a corresponding plurality of second regions on a first electrode plate by a coating device, and then a segmenting device segments the first electrode plate on the basis of the plurality of second regions, so as to form a plurality of segmented second electrode plates. As the plurality of second electrode plates after being subjected to lithium supplementing are formed at the same time, the lithium supplementing efficiency is greatly improved.

In one implementation, a calendering device includes calendering rollers, a coating device includes a fast roller, and the lithium strips pass through between the fast roller and the calendering rollers, so that lithium on the lithium strips is transferred to the first regions corresponding to the lithium strips on the fast roller.

In this embodiment, roller systems are used to transfer lithium on the lithium strips to a coating device, in which each calendering device includes calendering rollers, and the coating device includes a fast roller; and by means of the relative movement between the calendering rollers and the fast roller, lithium on the lithium strips is transferred to the first regions corresponding to the lithium strips on the fast roller when the lithium strips pass through between the fast roller and the calendering rollers, which is easy to implement and has high reliability.

In one implementation, a protective belt is provided between the lithium strips and the calendering rollers, the protective belt and the lithium strips pass through between the fast roller and the calendering rollers at the same time, and the protective belt is used for isolating the lithium strips from the calendering rollers. The protective belt can protect the lithium strips, so as to prevent the lithium strips from being damaged when passing through between the fast roller and the calendering rollers.

In one implementation, the material of the protective belt is polyethylene terephthalate (PET), which is easy to acquire and has a low cost.

In one implementation, the calendering device further includes back rollers, the calendering rollers are located between the back rollers and the fast roller, and the back rollers are used for providing a supporting force towards the fast roller for the calendering rollers.

As the size of the calendering rollers is generally smaller than that of the fast roller, when the calendering rollers and the fast roller move relative to each other, the side of the calendering rollers facing the fast roller may bear a relatively large pressure, which easily causes loss to the calendering rollers so as to affect the service life thereof. By adding the back rollers and providing the calendering rollers with a supporting force facing the fast roller, the pressure applied by the fast roller to the calendering rollers can be balanced, thereby protecting the calendering rollers.

In one implementation, the calendering device further includes a scraper used for controlling the width of the lithium in the first regions on the fast roller in the first direction. By means of the scraper, the width of the lithium of the first region on the fast roller can be precisely controlled to match the width of the respective second electrode plate.

In one implementation, the coating device further includes a laminating roller, and the first electrode plate passes through between the fast roller and the laminating roller, so as to coat lithium in the first regions on the fast roller onto the second regions corresponding to the first regions on the first electrode plate.

In this embodiment, roller systems are used to transfer lithium on a coating device to a first electrode plate; the coating device further includes a laminating roller arranged opposite to a fast roller; by means of the relative movement between the laminating roller and the fast roller, the first electrode plate passes through between the fast roller and the laminating roller, so as to coat lithium in the first regions on the fast roller onto the second regions corresponding to the first regions on the first electrode plate, which is easy to implement and has high reliability.

In one implementation, at least part of second regions among the plurality of second regions have different widths in the first direction. The lithium supplementing apparatus according to the embodiments of the present application can simultaneously form a plurality of second electrode plates with different widths after being subjected to lithium supplementing, thereby achieving better applicability.

In one implementation, the lithium supplementing apparatus includes a first sub-apparatus and a second sub-apparatus, each of the first sub-apparatus and the second sub-apparatus includes a plurality of calendering devices and a coating device, the first sub-apparatus is used for coating lithium on the plurality of second regions on the first surface of the first electrode plate, and the second sub-apparatus is used for coating lithium on the plurality of second regions on the second surface of the first electrode plate.

By providing two sets of sub-apparatuses, two surfaces of the first electrode plate are successively subjected to lithium supplementing, thereby enhancing the lithium supplementing effect of the second electrode plates.

As lithium is coated onto the plurality of second regions of the first electrode plate with a large width, subsequently, the first electrode plate needs to be segmented on the basis of the plurality of second regions, so as to form a plurality of segmented second electrode plates. In one implementation manner, the segmenting device includes a mechanical cutter or a laser cutter, and the first electrode plate is segmented by means of the mechanical cutter or the laser cutter, which is easy to operate and has high reliability.

In one implementation manner, the lithium supplementing apparatus further includes a plurality of winding devices for winding the plurality of second electrode plates after being subjected to lithium supplementing. The winding of the plurality of second electrode plates is completed by the plurality of winding devices, which is simple to operate and has high reliability.

According to a second aspect, provided is a lithium supplementing method, including: by means of a plurality of calendering devices, respectively transferring lithium on a plurality of lithium strips to a plurality of first regions distributed in a first direction on a coating device, the first direction being a width direction of a first electrode plate to be subjected to lithium supplementing; by means of the coating device, respectively coating lithium of the plurality of first regions on a plurality of second regions corresponding to the plurality of first regions on the first electrode plate; and by means of a segmenting device, segmenting the first electrode plate according to the plurality of second regions so as to form a plurality of segmented second electrode plates.

In one implementation, the calendering device includes calendering rollers, the coating device includes a fast roller, and the respectively transferring lithium in the plurality of lithium strips to a plurality of first regions distributed in a first direction on the coating device includes: the lithium strips passing through between the fast roller and the calendering rollers so that the lithium on the lithium strips is transferred to the first regions corresponding to the lithium strips on the fast roller.

In one implementation, the providing a protective belt between the lithium strips and the calendering rollers, and the lithium strips passing through between the fast roller and the calendering rollers includes: the protective belt and the lithium strips passing through between the fast roller and the calendering rollers at the same time, the protective belt being used for isolating the lithium strips from the calendering rollers.

In one implementation, the material of the protective belt is PET.

In one implementation, the calendering device further includes a scraper, and the method further includes: by means of the scraper, controlling the width of the lithium of the first regions on the fast roller in the first direction.

In one implementation, the coating device further includes a laminating roller; and the respectively coating the lithium in the plurality of first regions onto the plurality of second regions corresponding to the plurality of first regions on the first electrode plate includes: the first electrode plate passing through between the fast roller and the laminating roller to coat lithium in the first regions onto the second regions corresponding to the first regions on the first electrode plate.

In one implementation, at least part of second regions among the plurality of second regions have different widths in the first direction.

In one implementation, the method further includes: by means of a plurality of winding devices, winding the plurality of second electrode plates after being subjected to lithium supplementing.

BRIEF DESCRIPTION OF DRAWINGS

To describe the technical solutions in the embodiments of the present application more clearly, the accompanying drawings required for describing the embodiments of the present application are briefly introduced as follows. Obviously, the accompanying drawings in the following description show merely some embodiments of the present application, and for a person of ordinary skill in the art, other drawings may also be obtained according to these drawings without any inventive effort.

DETAILED DESCRIPTION

Figure 1:
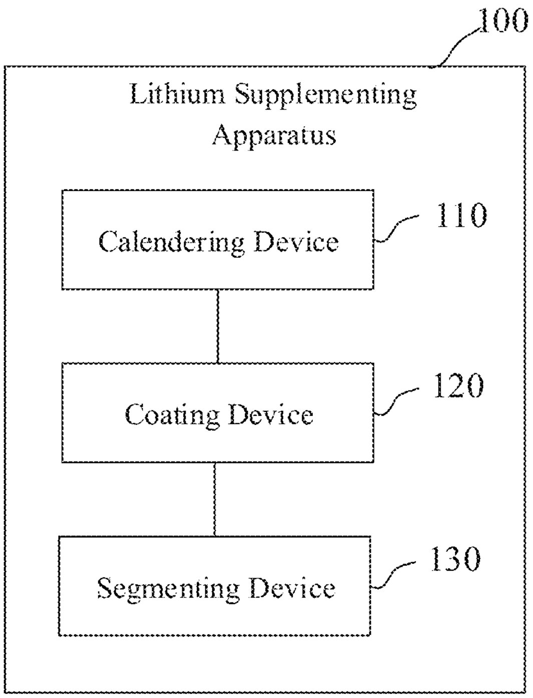
FIG. 1 is a schematic block diagram of a lithium supplementing apparatus according to the embodiments of the present application.

The implementations of the present application are further described as follows in detail with reference to the accompanying drawings and embodiments. The detailed description of the following embodiments and the accompanying drawings are used to exemplarily explain the principle of the present application, but shall not be used to limit the scope of the present application, i.e. the present application is not limited to the described embodiments.

In the description of the present application, it should be noted that, unless otherwise noted, "a plurality of" means two or more; orientation or positional relationships indicated by the terms "upper", "lower", "left", "right", "inner", "outer". etc. are only for the convenience of description of the present application and simplification of description rather than indicating or implying that the referred devices or elements must have a specific orientation, or be constructed and operated in a specific orientation. Therefore, these technical terms should not be understood as limitations to the embodiments of the present application. In addition, the terms "first", "second", "third". etc. are used for description only and cannot be understood as indicating or implying relative importance. The term "vertical" does not mean being strictly vertical, but within the allowable error range. The term "parallel" does not mean being strictly parallel, but within the allowable error range.

Nouns of locality in the following description are all directions shown in the drawings and do not limit the specific structure of the present application. In the description of the present application, it should also be noted that, unless otherwise expressly specified and limited, the terms "mount", "connected" and "connect" should be understood broadly, for example, they may be fixed connection, detachable connection, or integral connection; and may also be direct connection or indirect connection by means of an intermediate medium. A person of ordinary skill in the art may understand the specific meanings of the described terms in the present application according to specific situations.

A battery in the embodiments of the present application refers to a single physical module that includes one or more battery cells to provide a higher voltage and a larger capacity. For example, the battery mentioned in the present application may include a battery module or a battery pack, etc. A battery generally includes a box for enclosing one or more battery cells; the box can prevent liquids or other foreign substances from affecting charging or discharging of the battery cells;

a battery cell may include an electrode assembly and an electrolyte, wherein the electrode assembly is composed of a positive electrode plate, a negative electrode plate and a separator; the battery cells work by mainly relying on metal ions which move between the positive electrode plate and the negative electrode plate; the positive electrode plate includes a positive electrode current collector and a positive electrode active material layer; the positive electrode active material layer is coated on the surface of the positive electrode current collector; the current collector uncoated with the positive electrode active material layer protrudes from the current collector coated with the positive electrode active material layer; and the current collector uncoated with the positive electrode active material layer serves as a positive electrode tab; taking a lithium ion battery as an example, the material of the positive electrode current collector may be aluminum, and the positive electrode active material may be lithium cobalt oxide, lithium iron phosphate, three-dimensional lithium, lithium manganate. etc.; the negative electrode plate includes a negative electrode current collector and a negative electrode active material layer; the negative electrode active material layer is coated on a surface of the negative electrode current collector; the current collector uncoated with the negative electrode active material layer protrudes from the current collector coated with the negative electrode active material layer; and the current collector uncoated with the negative electrode active material layer serves as a negative electrode tab; the material of the negative electrode current collector may be copper, and the negative electrode active material may be graphite, carbon, silicon. etc. In order to ensure that a large current passes without fusing, there are a plurality of positive electrode tabs which are stacked together, and there are a plurality of negative electrode tab which are stacked together. The separator may be made of polypropylene (PP) or polyethylene (PE). etc. In addition, the electrode assembly may be of a wound structure or a laminated structure, and the embodiments of the present application are not limited thereto.

A common problem existing in batteries, such as lithium ion batteries, is that a large amount of lithium ions extracted from a positive electrode are consumed in a first charging process, so as to form a solid electrolyte interphase (solid electrolyte interphase, SEI) film on the surface of a negative electrode; and irreversible consumption of lithium ions of the positive electrode usually exceeds 10% in the first charging process, so that the efficiency for charge-discharge in the first cycle is relatively low, thereby reducing the energy density of the batteries. In addition, active lithium is continuously consumed by the batteries in normal use, resulting in greatly reduced service life of the batteries.

By supplementing lithium for a battery, not only the loss of active lithium during the use of the battery including the battery cell can be supplemented, prolonging the service life, but also the loss of active lithium during the first charging of the battery can be supplemented, thereby improving the energy density of the battery, and effectively improving the performance of the battery.

On this basis, the present application proposes a lithium supplementing solution, in which lithium on a plurality of lithium strips is simultaneously transferred to different regions of a coating device by means of a plurality of calendering devices, and lithium in different regions thereof is simultaneously transferred to different regions of a first electrode plate by means of the coating device, then a plurality of second electrode plates after being subjected to lithium supplementing are formed by means of segmentation, and as the plurality of second electrode plates after being subjected to lithium supplementing can be obtained at the same time, the lithium supplementing efficiency is greatly improved.

The technical solutions described in the embodiments of the present application are all applicable to various electric devices using batteries.

The electric devices may be, for example, a vehicle, a mobile phone, a portable device, a notebook, a ship, a spacecraft, an electric toy, an electric tool. etc. The vehicle can be an oil-fueled vehicle, a gas vehicle or a new energy vehicle, and the new energy vehicle can be a pure electric vehicle, a hybrid vehicle or an extended-range vehicle, etc.; the spacecraft includes an airplane, a rocket, a space shuttle, a spaceship, etc.; the electric toy includes a stationary or mobile electric toy, such as a game machine, an electric vehicle toy, an electric ship toy, an electric plane toy. etc.; the electric tool includes a metal cutting electric tool, a grinding electric tool, an electric tool for assembling an electric tool and an electric tool for railway, such as an electric drill, an electric grinder, an electric spanner, an electric screwdriver, an electric hammer, an electric hammer drill, a concrete vibrator, an electric planer, etc. The embodiments of the present application do not specifically limit the described electric devices.

FIG. 1 is a schematic block diagram of a lithium supplementing apparatus according to the embodiments of the present application. As shown in FIG. 1, the lithium supplementing apparatus 100 includes a plurality of calendering devices 110, a coating device 120, and a segmenting device 130;

in which the plurality of calendering devices 110 are used for respectively transferring lithium on the plurality of lithium strips 200 to a plurality of first regions 1211 distributed in a first direction X on the coating device 120, the first direction X being a width direction of a first electrode plate 210 to be subjected to lithium supplementing; the coating device 120 is used for coating the lithium in the plurality of first regions 1211 onto a plurality of second regions 1221 corresponding to the plurality of first regions 1211 on the first electrode plate 210 respectively; and the segmenting device 130 is used for segmenting the first electrode plate 210 according to the plurality of second regions 1221 so as to form a plurality of segmented second electrode plates 220.

Here, the plurality of first regions 1211 are a plurality of regions distributed in the first direction X on the coating device 120, the plurality of second regions 1221 are a plurality of regions distributed in the first direction X on the first electrode plate 210, and lithium on each of the first regions 1211 on the coating device 120 is coated onto the corresponding second regions 1221 on the first electrode plate 210. The first direction X is a width direction of the first electrode plate 210, i.e. the width direction of the first electrode plate 210.

Actually, the first electrode plate 210 is a electrode plate with a large width. After lithium is coated onto the plurality of second regions 1221 on the first electrode plate 210 at the same time, the plurality of second electrode plates 220 corresponding to the plurality of second regions 1221 are formed by means of segmentation, where each of the second electrode plates 220 includes a corresponding second region 1221 after being subjected to lithium supplementing.

In the embodiments of the present application, by the plurality of calendering devices 110, the lithium on the lithium strips 200 is simultaneously transferred to the plurality of first regions 1211 distributed in the width direction X of the electrode plate on the coating device 120; by the coating device 120, the lithium in the plurality of first region 1211 is transferred to the corresponding plurality of second region 1221 on the first electrode plate 210; and then, the segmenting device 130 segments the first electrode plate 210 on the basis of the plurality of second regions 1221, so as to form a plurality of segmented second electrode plates 220. As the plurality of second electrode plates 220 after being subjected to lithium supplementing are formed at the same time, the lithium supplementing efficiency is greatly improved.

In one implementation, a calendering device 110 includes calendering rollers 111, a coating device 120 includes a fast roller 121, and lithium strips 200 pass through between the fast roller 121 and the calendering rollers 111, so that lithium on the lithium strips 200 is transferred to first regions 1211 on the fast roller 121 corresponding to the lithium strips 200.

In this embodiment, the lithium on the lithium strips 200 is transferred to the coating device 120 by using roller systems, in which the calendering device 110 includes calendering rollers 111, and the coating device 120 includes a fast roller 121; by means of relative movement between the calendering rollers 111 and the fast roller 121, the lithium strips 200 passes through between the fast roller 121 and the calendering rollers 111, so that lithium on each lithium strip 200 is transferred to the first regions 1211 on the fast roller 121 corresponding to the lithium strips 200, which is easy to implement and has high reliability.

In one implementation, the coating device 120 further includes a laminating roller 122, and the first electrode plate 210 passes through between the fast roller 121 and the laminating roller 122, so as to coat lithium in the first regions 1211 on the fast roller 121 onto the second regions 1221 on the first electrode plate 210 corresponding to the first regions 1211.

In this embodiment, the lithium on the coating device 120 is transferred to the first electrode plate 210 by using roller systems, the coating device 120 further includes a laminating roller 122 provided opposite to the fast roller 121, and by means of the relative movement between the laminating roller 122 and the fast roller 121, the first electrode plate 210 passes through between the fast roller 121 and the laminating roller 122, so that the lithium in the first regions 1211 on the fast roller 121 is coated onto the second regions 1221 on the first electrode plate 210 corresponding to the first regions 1211, which is easy to implement and has high reliability.

Figure 2:
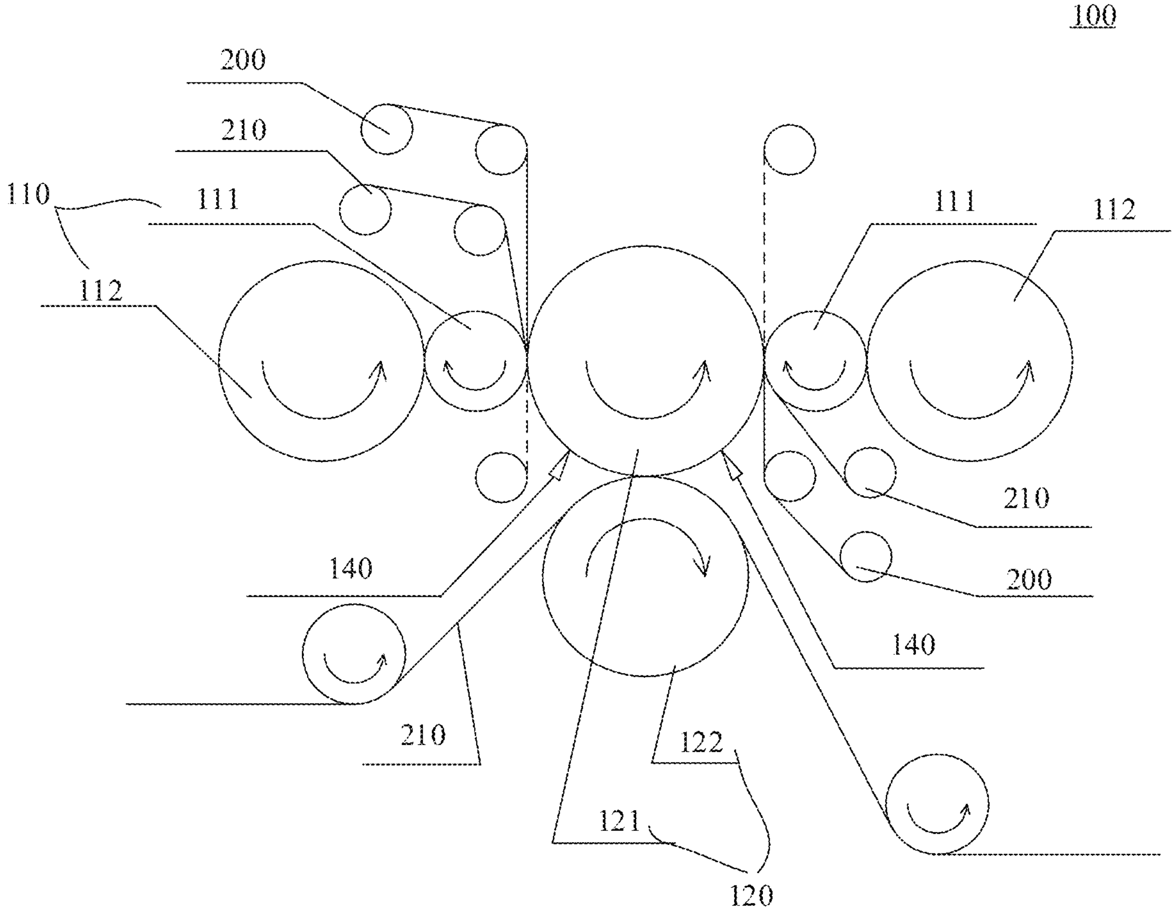
FIG. 2 is a schematic structural diagram of a possible implementation of the lithium supplementing apparatus shown in FIG. 1.

For example, FIG. 2 is a schematic structural diagram of a possible implementation of the lithium supplementing apparatus 100 shown in FIG. 1. As shown in FIG. 2, the calendering device 110 includes calendering rollers 111, and the coating device 120 includes a fast roller 121 and a laminating roller 122. The plurality of calendering rolls 111 surround the fast roller 121 and are staggered in the first direction X, that is, the roller surfaces of the calendering rollers 111 do not overlap in the first direction X. When the lithium strips 200 pass through between the fast roller 121 and the calendering rollers 111, the lithium on the lithium strips 200 is transferred to the first regions 1211 on the fast roller 121 corresponding to the lithium strips 200. Then, when the first electrode plate 210 passes through between the fast roller 121 and the laminating roller 122, the lithium in the first regions 1211 on the fast roller 121 is transferred to the second regions 1221 on the first electrode plate 210 corresponding to the first regions 1211.

Generally, the size of the calendering rollers 111 is smaller than the size of the fast roller 121, for example, as shown in FIG. 2, the diameter of the calendering rollers 111 is smaller than the diameter of the fast roller 121, and the size of the calendering rollers 11 in the first direction X is also smaller than the size of the fast roller 121. In this way, when the calendering rollers 111 and the fast roller 121 move relative to each other, the side of the calendering rollers 111 facing the fast roller 121 may bear a relatively large pressure, which tends to cause loss to the calendering rollers 111, and affects the service life thereof.

To this end, in one implementation, as shown in FIG. 2, the calendering device 110 can further include back rollers 112, the calendering rollers 111 are located between the back rollers 112 and the fast roller 121, and the back rollers 112 are used to provide a supporting force to the calendering rollers 111 toward the fast roller 121. By adding the back rollers 112, a supporting force towards the fast roller 121 is provided to the calendering rollers 111, and the pressure applied to the calendering rollers 111 by the fast roller 121 can be balanced, thereby protecting the calendering rollers 111.

Figure 3:
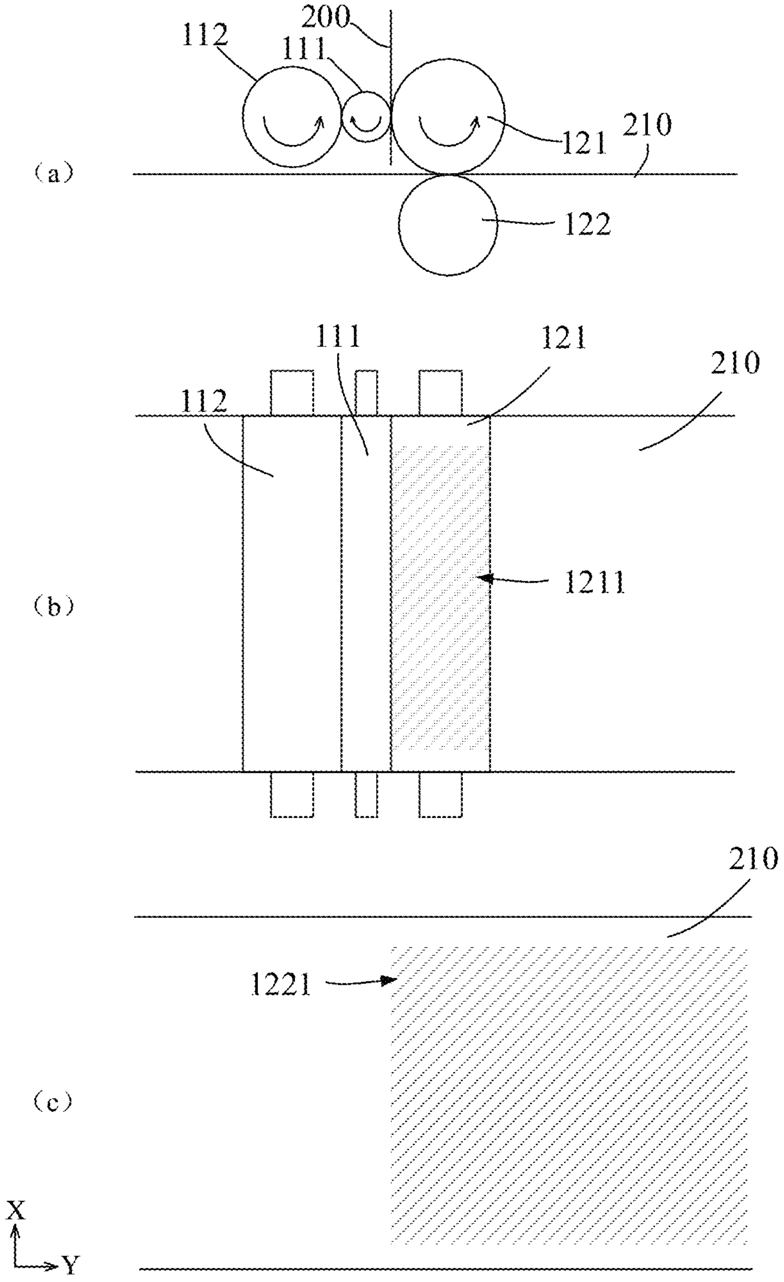
FIG. 3 is a schematic diagram of a relative position between calendering rollers and a fast roller.
Figure 4:
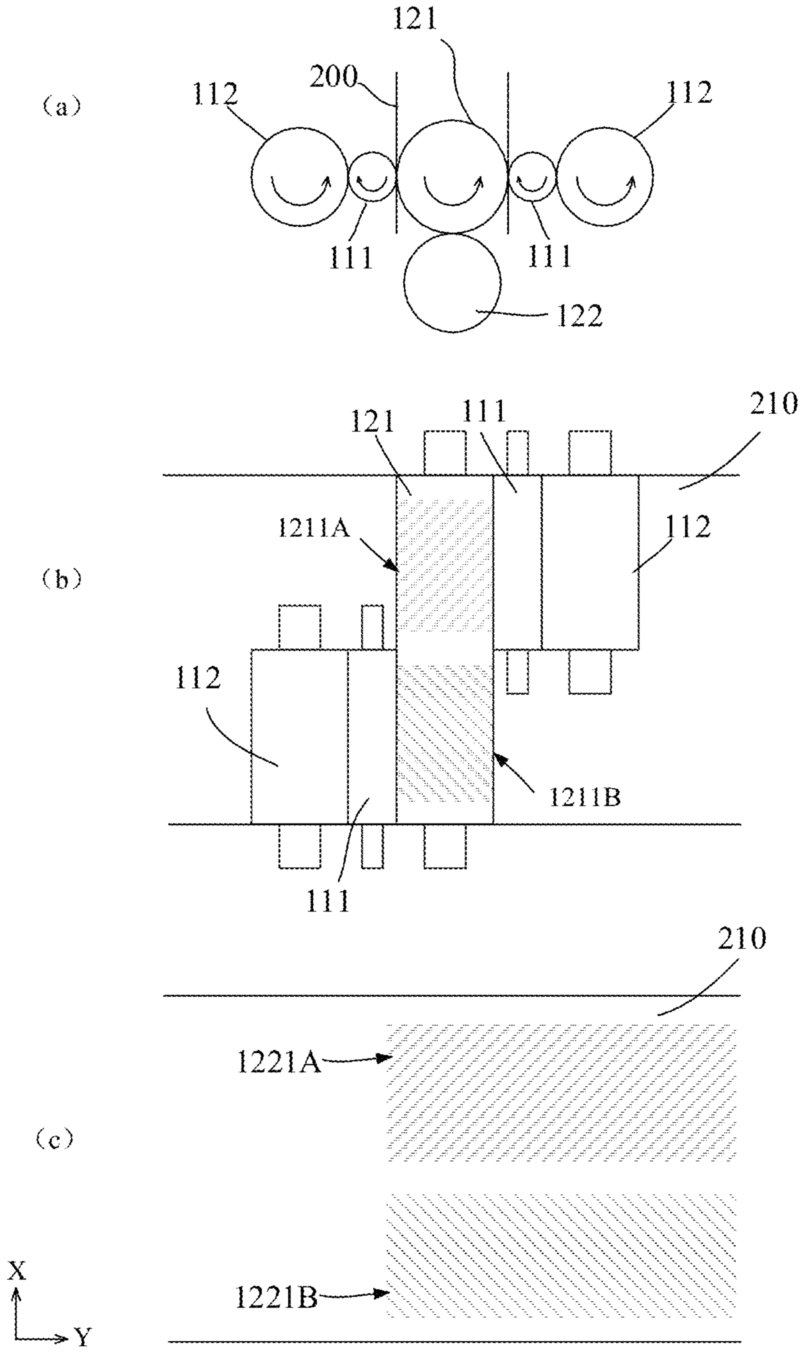
FIG. 4 is a schematic diagram of a relative position between calendering rollers and a fast roller.
Figure 5:
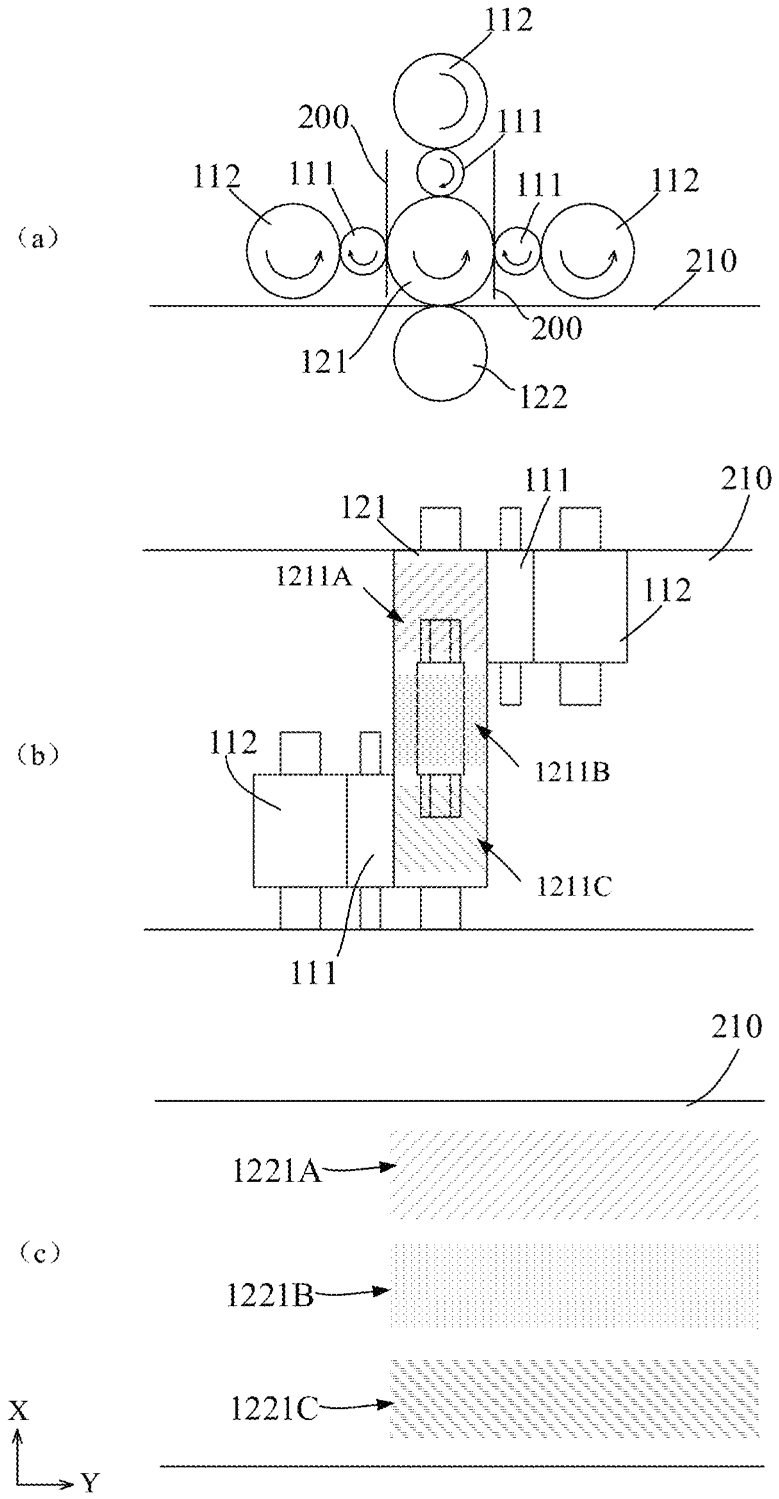
FIG. 5 is a schematic diagram of a relative position between calendering rollers and a fast roller.
Figure 6:
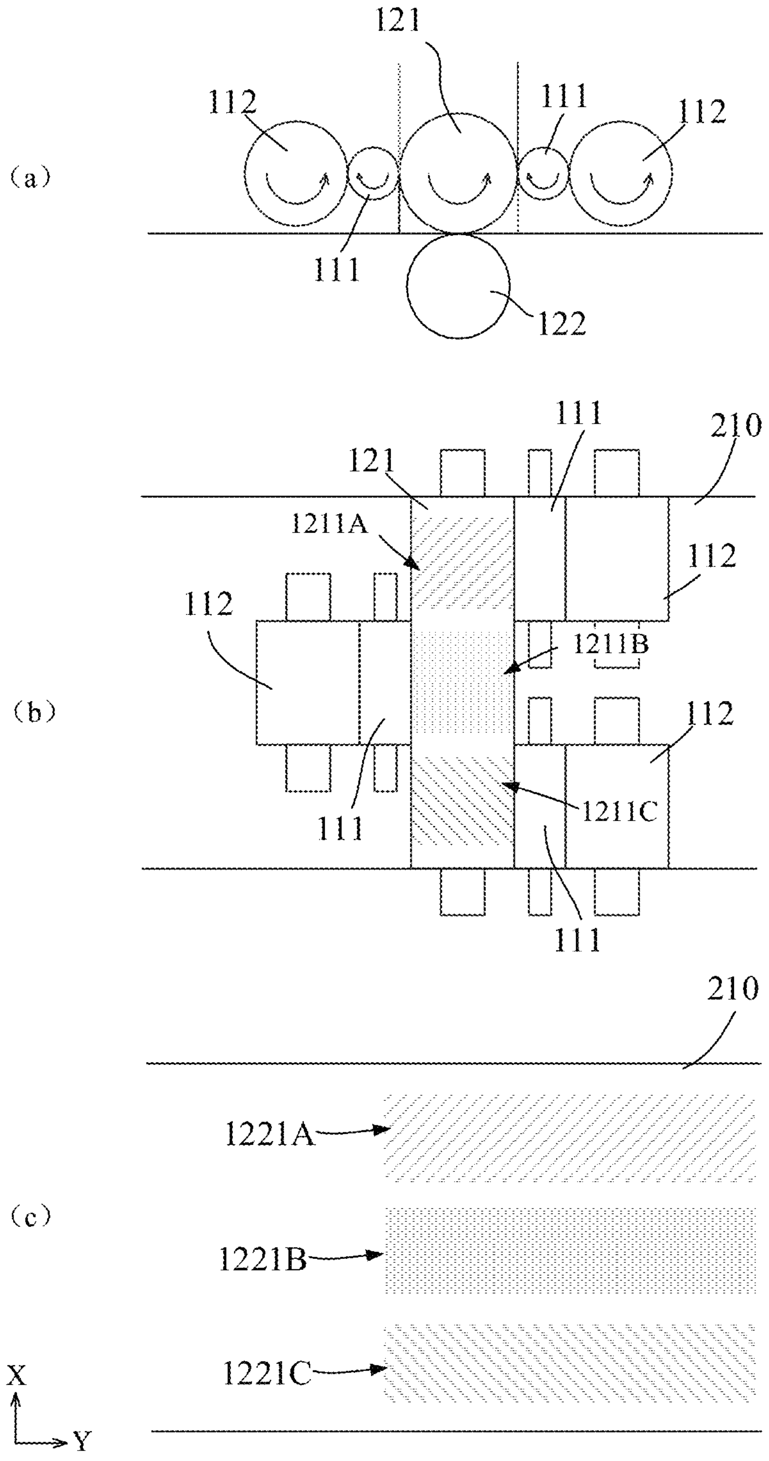
FIG. 6 is a schematic diagram of a relative position between calendering rollers and a fast roller.
Figure 7:
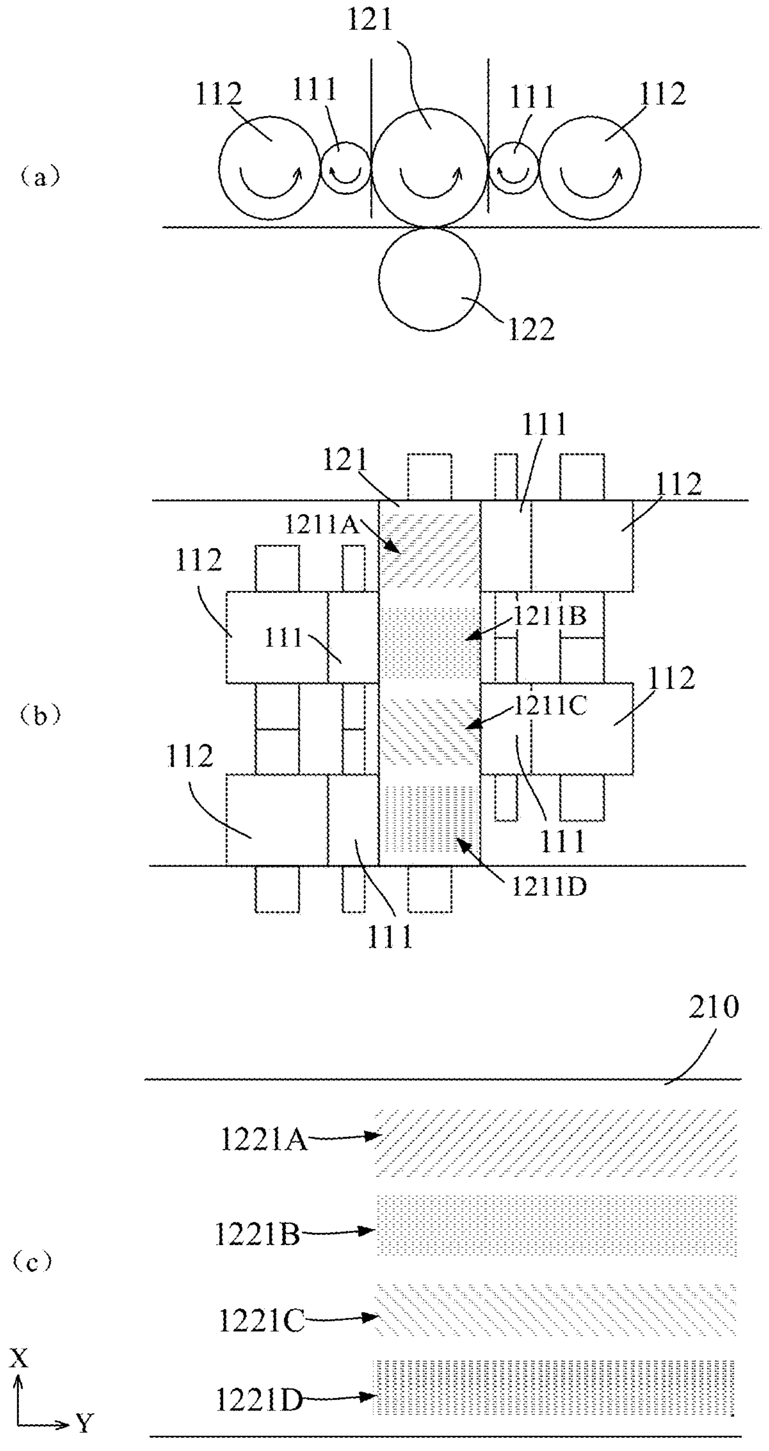
FIG. 7 is a schematic diagram of a relative position between calendering rollers and a fast roller.

FIG. 2 shows a plurality of calendering devices 110. With reference to FIG. 3 to FIG. 7, it can be more clearly illustrated how lithium on a plurality of lithium strips 200 is transferred to a plurality of second regions 1221 on the first electrode plate 210 simultaneously by using the plurality of calendering devices 110 as follows. FIG. 3 shows a case where there is only one calendering device 110, and "one-into-one" can be achieved, i.e. only one second electrode plate 220 is sent out after a first electrode plate 210 is sent into the lithium supplementing apparatus 100. FIG. 4 shows a case where two calendering devices 110 are provided, i.e. "one-into-two" can be achieved, that is, two second electrode plates 220 are sent out after a first electrode plate 210 is sent into the lithium supplementing apparatus 100. FIGS. 5 and 6 show a case where three calendering devices 110 are provided, i.e. "one-into-three" can be achieved, that is, three second electrode plates 220 are sent out after a first electrode plate 210 is sent into the lithium supplementing apparatus 100. FIG. 7 shows a case where four calendering devices 110 are provided, i.e. "one-into-four" can be achieved, that is, four second electrode plates 220 are sent out after a first electrode plate 210 is sent into the lithium supplementing apparatus 100.

As shown in FIG. 3, FIG. 3 is a schematic diagram of the relative positions of the calendering devices 110 and the coating device 120 in the lithium supplementing apparatus 100 shown in FIG. 2, in which (a) in FIG. 3 is a side view of the calendering devices 11 and the coating device 120, (b) is a top view thereof, and (c) is a schematic diagram of the surface of the first electrode plate 210 facing towards the calendering devices 110. Each calendering device 110 includes calendering rollers 111 and back rollers 112, and the coating device 120 includes a fast roller 121 and a laminating roller 122. It can be determined from FIG. 3 that the fast roller 121 and the calendering rollers 111 are oppositely provided in a Y direction, the Y direction is perpendicular to the first direction X, and the first direction X is the width direction of the first electrode plate 210. When the lithium strips 200 pass through between the fast roller 121 and the calendering rollers 111, the lithium on the lithium strips 200 is transferred to the first regions 1211 of the fast roller 121. Then, when the first electrode plate 210 passes through between the fast roller 121 and the laminating roller 122, the lithium in the first regions 1211 of the fast roller 121 is transferred to the second regions 1221 on the first electrode plate 210 corresponding to the first region 1211.

Compared with FIG. 3, two calendering devices 110 are provided in FIG. 4. In FIG. 4, (a) is a side view of the calendering devices 110 and the coating device 120, (b) is a top view thereof, and (c) is a schematic diagram of the surface of the first electrode plate 210 facing the calendering devices 110. It can be determined from FIG. 4 that two calendering rollers 111 are provided on both sides of the fast roller 121 in the Y direction, and the two calendering rollers 111 are staggered in the first direction X. One lithium strip 200 passes through between the fast roller 121 and one calendering roller 111, and the other lithium strip 200 passes through between the fast roller 121 and the other calendering roller 111. In this way, lithium on the two lithium strips 200 can be simultaneously transferred to two first regions 1211 arranged in the first direction X of the fast roller 121, including a first region 1211A and a first region 1211B. In FIG. 4, the first region 1211A and the first region 1211B are filled with different line patterns to distinguish them. Then, when the first electrode plate 210 passes through between the fast roller 121 and the laminating roller 122 from left to right, the lithium in the first region 1211A of the fast roller 121 is transferred to the second region 1221A on the first electrode plate 210 corresponding to the first region 1211A, and the lithium in the first region 1211B of the fast roller 121 is transferred to the second region 1221B on the first electrode plate 210 corresponding to the first region 1211B.

Compared with FIG. 4, three calendering devices 110 are provided in FIG. 5. In FIG. 5, (a) is a side view of the calendering devices 110 and the coating device 120, (b) is a top view thereof, and (c) is a schematic diagram of the surface of the first electrode plate 210 facing the calendering devices 110. As shown in FIG. 5, two calendering rollers 111 are arranged on both sides of the fast roller 121 in the Y direction, and another calendering roller 111 is arranged on a side of the fast roller 121 in the first direction X; and the three calendering rolls 111 are staggered in the first direction X. The lithium strips 200 passes through between the fast roller 121 and each of the calendering rollers 111, so that the lithium on the lithium strips 200 is simultaneously transferred to the three first regions 1211 of the fast roller 121 arranged in the first direction X, including a first region 1211A, a first region 1211B and a first region 1211C. In FIG. 5, the first region 1211A, the first region 1211B and the first region 1211C are filled with different line patterns so as to distinguish them. Then, when the first electrode plate 210 passes through between the fast roller 121 and the laminating roller 122 from left to right, the lithium in the first region 1211A of the fast roller 121 is transferred to the second region 1221A of the first electrode plate 210 corresponding to the first region 1211A, the lithium in the first region 1211B of the fast roller 121 is transferred to the second region 1221B of the first electrode plate 210 corresponding to the first region 1211B, and the lithium in the first region 1211C of the fast roller 121 is transferred to the second region 1221C of the first electrode plate 210 corresponding to the first region 1211C.

Compared with FIG. 4, three calendering devices 110 are provided in FIG. 6. The difference between FIGS. 6 and 5 is that the relative positions of the three calendering rollers 111 are different. In FIG. 6, (a) is a side view of the calendering devices 110 and the coating device 120, (b) is a top view thereof, and (c) is a schematic diagram of the surface of the first electrode plate 210 facing the calendering devices 110. It can be determined from FIG. 6 that, at two sides of the fast roller 121 in the Y direction, one side is provided with a calendering roller 111, and the other side is provided with two calendering rollers 111; and the three calendering rollers 111 are staggered in the first direction X. The lithium strips 200 pass through between the fast roller 121 and each of the calendering rollers 111, so that the lithium on the lithium strips 200 is simultaneously transferred to the three first regions 1211 of the fast roller 121 arranged in the first direction X, including a first region 1211A, a first region 1211B and a first region 1211C. In FIG. 5, the first region 1211A, the first region 1211B and the first region 1211C are filled with different line patterns so as to distinguish them. Then, when the first electrode plate 210 passes through between the fast roller 121 and the laminating roller 122 from left to right, the lithium in the first region 1211A of the fast roller 121 is transferred to the second region 1221A corresponding to the first region 1211A on the first electrode plate 210, the lithium in the first region 1211B of the fast roller 121 is transferred to the second region 1221B corresponding to the first region 1211B on the first electrode plate 210, and the lithium in the first region 1211C of the fast roller 121 is transferred to the second region 1221C corresponding to the first region 1211C on the first electrode plate 210.

Compared with FIGS. 5 and 6, four calendering devices 110 are provided in FIG. 7. In FIG. 7, (a) is a side view of the calendering devices 110 and the coating device 120, (b) is a top view thereof, and (c) is a schematic diagram of the surface of the first electrode plate 210 facing the calendering devices 110. It can be determined from FIG. 7 that, at two sides of the fast roller 121 in the Y direction, one side is provided with two calendering rollers 111, and the other side is provided with two calendering rollers 111; and the four calendering rollers 111 are staggered in the first direction X. The lithium strips 200 pass through between the fast roller 121 and each of the calendering rollers 111, so that the lithium on the lithium strips 200 is simultaneously transferred to the three first regions 1211 of the fast roller 121 arranged in the first direction X, including the first region 1211A, the first region 1211B and the first region 1211C. In FIG. 5, the first region 1211A, the first region 1211B, the first region 1211C and the first region 1211D are filled with different line patterns so as to distinguish them. Then, when the first electrode plate 210 passes through from the fast roller 121 and the laminating roller 122 from left to right, the lithium in the first region 1211A of the fast roller 121 is transferred to the second region 1221A corresponding to the first region 1211A on the first electrode plate 210, the lithium in the first region 1211B of the fast roller 121 is transferred to the second region 1221B corresponding to the first region 1211B on the first electrode plate 210, the lithium in the first region 1211C of the fast roller 121 is transferred to the second region 1221C corresponding to the first region 1211C on the first electrode plate 210, and the lithium in the first region 1211D of the fast roller 121 is transferred to the second region 1221D corresponding to the first region 1211D on the first electrode plate 210.

It should be understood that FIGS. 3-7 are merely examples, and the relative position between the plurality of calendering rollers 111 and the fast roller 121 may also have other implementations. The number of calendering rollers 111 may also be larger.

In one implementation, as shown in FIG. 2-7, a protective belt 210 is provided between the lithium strips 200 and the calendering rollers 111, the protective belt 210 and the lithium strips 200 pass through between the fast roller 121 and the calendering rollers 111 at the same time, and the protective belt 210 is used for isolating the lithium strips 200 from the calendering rollers 111. The protective belt 210 can protect the lithium strips 200, so as to prevent the lithium strips 200 from being damaged when passing through between the fast roller 121 and the calendering rollers 111. The material of the protective belt 210 is, for example, polyethylene terephthalate (PET) and the like, which is easy to acquire and has a low cost.

In one implementation, as shown in FIGS. 2-7, the calendering device 110 further includes a scraper 140, the scraper 140 being used for controlling the width of the lithium in the first direction X in the first region 1211 on the fast roller 111. By means of the scraper 140, the width of the lithium in the first region 1211 of the fast roller 11 can be precisely controlled to match the width of the corresponding second electrode plate 220.

For example, as shown in FIGS. 2 to 7, the widths of lithium of the first region 1211A, the first region 1211B, the first region 1211C, and the first region 1211D in the first direction X may be controlled by the scraper 140. Taking the first region 1211A as an example, assuming that a required width of lithium in the first region 1211A is W, the scraper 140 corresponding to the first region 1211A can scrape off lithium outside the width W in the rotation process of the fast roller 121, and keep the lithium within the width W, so that the width of lithium transferred to the second region 1221A corresponding to the first region 1211A on the first electrode plate 210 is W, so as to match the width of the second electrode plate 220 corresponding to the second region 1221A.

In one implementation, at least some of the second regions 1221 of the plurality of second regions 1221 have different widths in the first direction X. That is, the plurality of second regions 1221 may have the same width in the first direction X, or may have different widths in part or all of the first direction X.

For example, as shown in FIG. 2-7, the widths in the first direction X of the first region 1211A, the first region 1211B, the first region 1211C, and the first region 1211D may be the same or different. In this way, the widths of the second regions 1221A, the second regions 1221B, the second regions 1221C, and the second regions 1221D on the first electrode plate 210 are also different, and after segmentation is performed by the segmenting device 130, the plurality of second electrode plates 220 with different widths can be formed.

According to the lithium supplementing apparatus 100 of the embodiments of the present application, a plurality of second electrode plates 220 with different widths after being subjected to lithium supplementing may be simultaneously formed, and the lithium supplementing apparatus is more applicable.

In one implementation, the lithium supplementing apparatus 100 includes a first sub-apparatus 101 and a second sub-apparatus 102, each of the first sub-apparatus 101 and the second sub-apparatus 102 includes the plurality of calendering devices 110 and the coating device 120, the first sub-apparatus 101 is used for coating lithium on the plurality of second regions 1221 on the first surface 210A of the first electrode plate 210, and the second sub-apparatus is used for coating lithium on the plurality of second regions 1221 on the second surface 210B of the first electrode plate 210.

Figure 8:
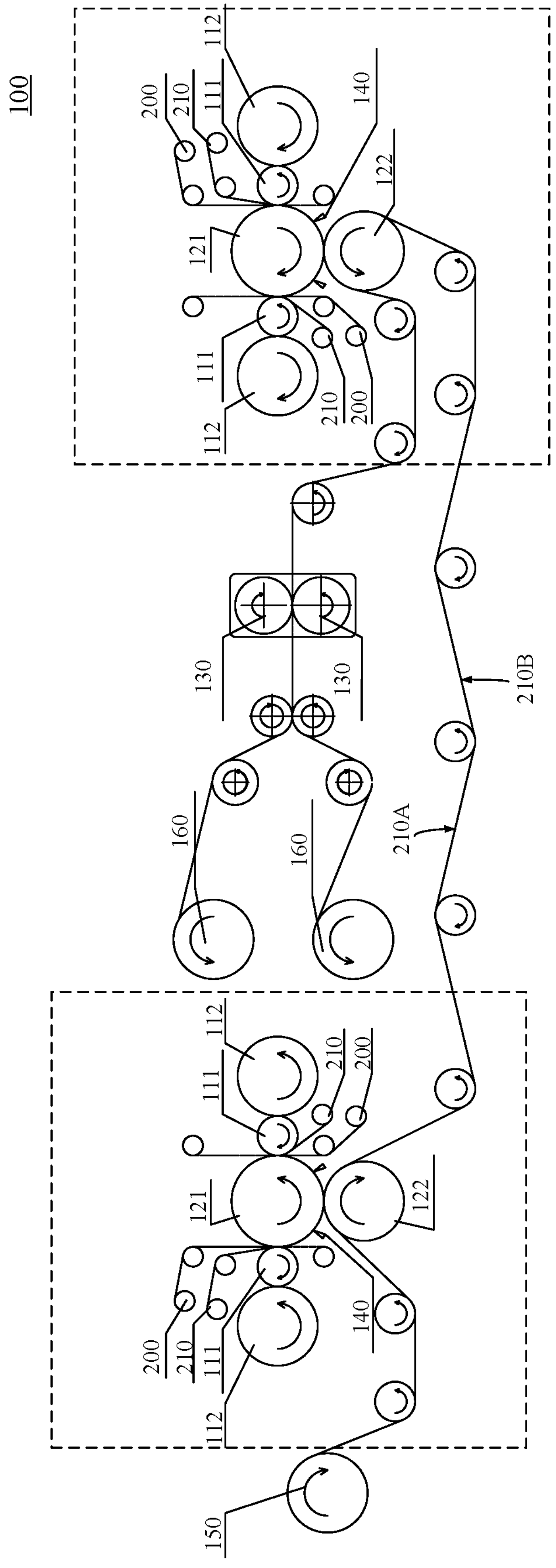
FIG. 8 is a schematic diagram of a relative position between calendering rollers and a fast roller.

For example, as shown in FIG. 8, the lithium supplementing apparatus 100 includes two sets of sub-apparatuses, that is, a first sub-apparatus 101 and a second sub-apparatus 102; the first sub-apparatus 101 is used for performing lithium supplementing on a first surface 210A of a first electrode plate 210, and the second sub-apparatus 102 is used for performing lithium supplementing on a second surface 210B of the first electrode plate 210. The process of performing, by the second set of sub-apparatus 102, lithium supplementing on the second surface 210B of the first electrode plate 210 is similar to the described process of performing, by the first sub-apparatus 101, lithium supplementing on the first surface 210A of the first electrode plate 210. For brevity, details are not described herein again. By providing the two sets of sub-apparatuses, lithium supplementing is performed on the two surfaces of the first electrode plate 210 successively, thereby enhancing the lithium supplementing effect of the second electrode plate 220. As shown in FIG. 8, after the lithium supplementing of both surfaces of the first electrode plate 210 is completed, segmentation is performed by means of the segmenting device 130 to form a plurality of second electrode plates 220.

As lithium is formed on the plurality of second regions 1221 of the first electrode plate 210 having a large width at the same time, the first electrode plate 210 needs to be segmented by the segmenting device 130 on the basis of the plurality of second regions 1221, so as to form a plurality of segmented second electrode plates 220.

The segmenting device 130 includes, for example, a mechanical cutter or a laser cutter, and segments the first electrode plate 210 by means of the mechanical cutter or the laser cutter, which is easy to operate and has high reliability. In FIG. 8, a circular cutter is taken as an example, and the circular cutter is used to segment the first electrode plate 210 on the basis of the plurality of second regions 1221, so as to form the plurality of second electrode plates 220 corresponding to the plurality of second regions.

Other processes may also be performed on each segmented second electrode plate 220 to form a part such as a tab, where the tab is formed in a region of the second electrode plate 220 in which lithium is not coated. Thereafter, the electrode assembly is formed by, for example, winding or laminating.

In one implementation, as shown in FIG. 8, the lithium supplementing apparatus 100 further includes an unwinding device 150 used for releasing the first electrode plate 210. As shown in FIG. 8, the unwinding device 150 may be, for example, an unwinding roller 150.

In one implementation, as shown in FIG. 8, the lithium supplementing apparatus 100 further includes a plurality of winding devices 160, used for winding the plurality of second electrode plates 220 after being subjected to lithium supplementing. As shown in FIG. 8, the winding devices 160 may be, for example, winding rollers 160.

By means of the unwinding device 150 and the plurality of winding devices 160, unwinding of the first electrode plate 210 and unwinding of the plurality of second electrode plates 220 are completed respectively, which is easy to operate and has high reliability.

It can be determined that, in the embodiments of the present application, by reasonably arranging the relative positions of the plurality of calendering rollers 111 and the fast roller 121 so as to simultaneously form the plurality of second electrode plates 220 after being subjected to lithium supplementing, the lithium supplementing efficiency is greatly improved, and lithium supplementing and segmenting of the first electrode plate 210 with a large width are integrally integrated, thereby further improving the productivity and reducing the cost investment.

Figure 9:
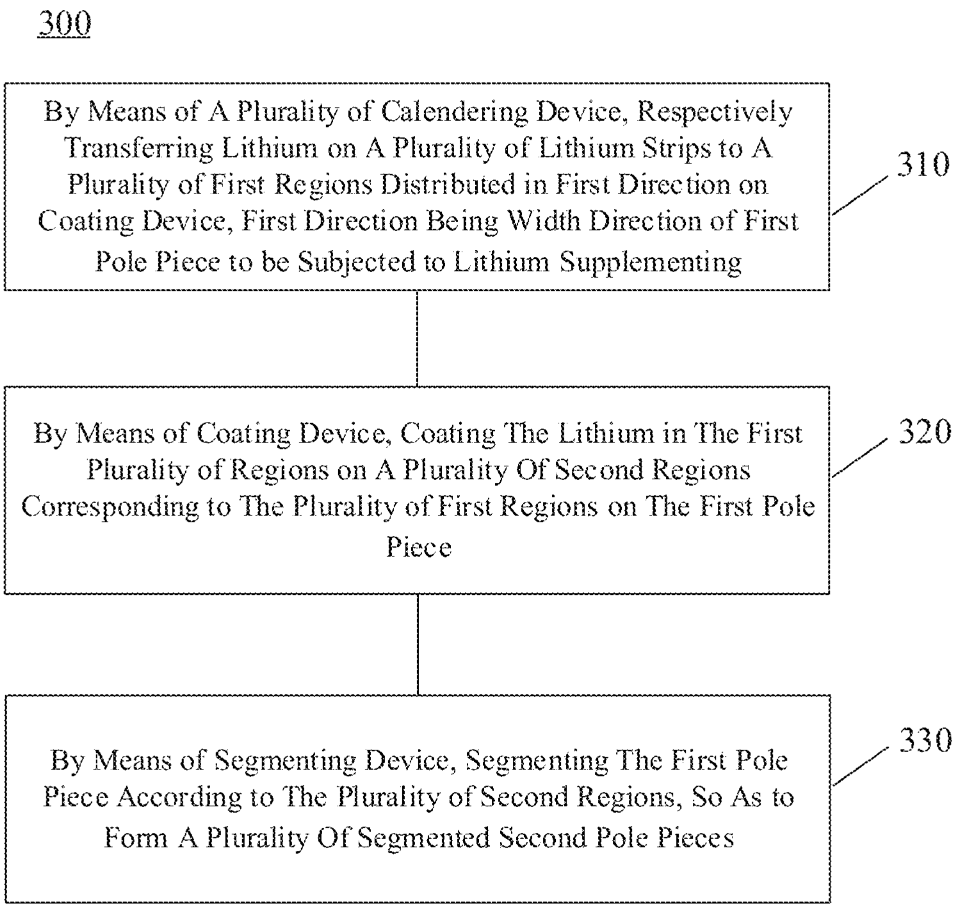
FIG. 9 is a schematic flowchart of a lithium supplementing method according to the embodiments of the present application.

FIG. 9 shows a lithium supplementing method 300 according to the embodiments of the present application. The lithium supplementing method 300 may be executed by the lithium supplementing apparatus 100. As shown in FIG. 9, the method 100 includes some or all of the following steps:

- step 310, by means of a plurality of calendering devices 110, respectively transferring lithium on a plurality of lithium strips 200 to a plurality of first regions 1211 distributed in a first direction X on a coating device 120, the first direction X is being width direction of a first electrode plate 210 to be subjected to lithium supplementing;
- step 320, by means of a coating device 120, coating lithium in the plurality of first regions 1211 onto the first electrode plate 210 to form a plurality of second regions 1221 corresponding to the plurality of first regions 1211;
- and step 330, by means of a segmenting device 130, segmenting the first electrode plate 210 according to the plurality of second regions 1221, so as to form a plurality of segmented second electrode plates 220.

In one implementation, the calendering device 110 includes calendering rollers 111, the coating device 120 includes a fast roller 121, and the transferring lithium on the plurality of lithium strips 200 to a plurality of first regions 1211 distributed in a first direction X on the coating device 120 respectively includes: the lithium strips 200 passing through between the fast roller and the calendering rollers 111, so that the lithium on the lithium strips 200 is transferred to the first regions 1211 corresponding to the lithium strips 200 on the fast roller 121.

In one implementation, a protective belt 210 is provided between the lithium strips 200 and the calendering rollers 111, and the lithium strips 200 passing through between the fast roller 121 and the calendering rollers 111 includes: the protective belt 210 and the lithium strips 200 passing through between the fast roller 121 and the calendering rollers 111 at the same time, the protective belt 210 being used for isolating the lithium strips 200 from the calendering rollers 111.

In one implementation, the material of the protective belt 210 is PET.

In one implementation, the calendering device 110 further includes a scraper 140, and the method further includes: controlling, by the scraper 140, the width of the first regions 1211 on the fast roller in the first direction X.

In one implementation, the coating device 120 further includes a laminating roller 122, and the coating the lithium of the plurality of first regions 1211 onto the plurality of second regions 1221 of the first electrode plate 210 corresponding to the plurality of first regions 1211 respectively includes: the first electrode plate 210 passing through between the fast roller and the laminating roller 122, so as to coat the lithium of the first regions 1211 on the fast roller 121 onto the second regions 1221 of the first electrode plate 210 corresponding to the first regions 1211.

In one implementation, at least some of the second regions 1221 of the plurality of second regions 1221 have different widths in the first direction X.

In one implementation, the method 300 further includes: by means of a plurality of winding devices 160, respectively performing winding on the plurality of second electrode plates 220 after being subjected to lithium supplementing.

It should be understood that, for specific implementations of the lithium supplementing method 300 and beneficial effects thereof in the method embodiments, reference may be made to the description of the lithium supplementing apparatus 100 in the apparatus embodiments, and for brevity, details are not repeatedly described herein.

Persons of ordinary skill in the art may be aware that, exemplary units and algorithm steps described in combination with the embodiments disclosed in this text may be implemented by electronic hardware, or a combination of computer software and electronic hardware. Whether these functions are executed in the form of hardware or software depends on specific application and design constraint conditions of the technical solution. Those skilled in the art may implement the described functions for each specific application in different ways, but such implementation shall not be considered to be beyond the scope of the present application.

It may be clearly understood by a person skilled in the art that, for the purpose of convenient and brief description, for the detailed working processes of the described systems, apparatuses and units, reference may be made to the corresponding processes in the described method embodiments, which are not repeatedly described herein.

In the several embodiments provided in the present application, it should be understood that the disclosed systems, apparatuses, and methods may be implemented in other manners. For example, the apparatus embodiments described above are merely exemplary, for example, division of the described units is merely logical function division, and there may be other division manners in actual implementation, for instance, a plurality of units or components may be combined or integrated into another system, or some features may be ignored or not executed. In addition, the displayed or discussed mutual couplings or direct couplings or communication connections may be implemented by means of some interfaces, and the indirect couplings or communication connections among the devices or units may be implemented in electrical and mechanical manners, or in other forms.

The units described as separate parts may or may not be physically separate, and parts displayed as units may or may not be physical units, i.e. may be located in one position, or may be distributed on a plurality of network units. Some or all of the units may be selected according to actual requirements to achieve the purposes of the solutions of the embodiments.

What is claimed is:

1. A lithium supplementing apparatus, comprising:

a plurality of calendering devices used for respectively transferring lithium on a plurality of lithium strips to a plurality of first regions distributed in a first direction on a coating device, the first direction being a width direction of a first electrode plate to be subjected to lithium supplementing;

the coating device used for respectively coating lithium of the plurality of first regions on a plurality of second regions corresponding to the plurality of first regions on the first electrode plate; and a segmenting device used for segmenting the first electrode plate according to the plurality of second regions so as to form a plurality of segmented second electrode plates.

2. The lithium supplementing apparatus according to claim 1, wherein each calendering device comprises calendering rollers, the coating device comprises a fast roller, and the lithium strips pass through between the fast roller and the calendering rollers, so that lithium on the lithium strips is transferred to the first regions corresponding to the lithium strips on the fast roller.

3. The lithium supplementing apparatus according to claim 2, wherein a protective belt is provided between the lithium strip and the calendering rollers, the protective belt and the lithium strips pass through between the fast roller and the calendering rollers at the same time, and the protective belt is used for isolating the lithium strips from the calendering rollers.

4. The lithium supplementing apparatus according to claim 3, wherein a material of the protective belt is polyethylene terephthalate (PET).

5. The lithium supplementing apparatus according to claim 2, wherein the calendering device further comprises back rollers, the calendering rollers are located between the back rollers and the fast roller, and the back rollers are used for providing a supporting force for the calendering rollers towards the fast roller.

6. The lithium supplementing apparatus according to claim 2, wherein the calendering device further comprises a scraper used for controlling the width of the lithium in the first regions on the fast roller in the first direction.

7. The lithium supplementing apparatus according to claim 2, wherein the coating device further comprises a laminating roller, and the first electrode plate passes through between the fast roller and the laminating roller, so as to coat lithium in the first regions on the fast roller to the second regions corresponding to the first regions on the first electrode plate.

8. The lithium supplementing apparatus according to claim 1, wherein at least part of the second regions among the plurality of second regions have different widths in the first direction.

9. The lithium supplementing apparatus according to claim 1, wherein the lithium supplementing apparatus comprises a first sub-apparatus and a second sub-apparatus, each of the first sub-apparatus and the second sub-apparatus comprises the plurality of calendering devices and the coating device, the first sub-apparatus is used for coating lithium on the plurality of second regions on a first surface of the first electrode plate, and the second sub-apparatus is used for coating lithium on the plurality of second regions on a second surface of the first electrode plate.

10. The lithium supplementing apparatus according to claim 1, wherein the segmenting device comprises a mechanical cutter or a laser cutter.

11. The lithium supplementing apparatus according to claim 1, wherein the lithium supplementing apparatus further comprises a plurality of winding devices for winding the plurality of second electrode plates after being subjected to lithium supplementing.

12. A lithium supplementing method, comprising:

by means of a plurality of calendering devices, respectively transferring lithium on a plurality of lithium strips to a plurality of first regions distributed in a first direction on a coating device, the first direction being a width direction of a first electrode plate to be subjected to lithium supplementing;

by the coating device, coating the lithium in the plurality of first regions on a plurality of second regions corresponding to the plurality of first regions on the first electrode plate;

and by means of a segmenting device, segmenting the first electrode plate according to the plurality of second regions, so as to form a plurality of segmented second electrode plates.

13. The lithium supplementing method according to claim 12, wherein the calendering device comprises a calendering roller, the coating device comprises a fast roller, and the respectively transferring lithium in the plurality of lithium strips to a plurality of first regions distributed in a first direction on the coating device comprises:

the lithium strips passing through between the fast roller and the calendering rollers so that the lithium on the lithium strips is transferred to the first regions corresponding to the lithium strips on the fast roller.

14. The lithium supplementing method according to claim 13, wherein the providing a protective belt between the lithium strips and the calendering rollers, and the lithium strips passing through between the fast roller and the calendering rollers comprise:

the protective belt and the lithium strips passing through between the fast roller and the calendering rollers at the same time, the protective belt being used for isolating the lithium strips from the calendering rollers.

15. The lithium supplementing method according to claim 14, wherein the material of the protective belt is polyethylene terephthalate (PET).

16. The lithium supplementing method according to claim 13, wherein the calendering device further comprises a scraper, and the method further comprises:

by the scraper, controlling the width of the lithium of the first regions on the fast roller in the first direction.

17. The lithium supplementing method according to claim 13, wherein the coating device further comprises a laminating roller, and the respectively coating the lithium in the plurality of first regions onto the plurality of second regions corresponding to the plurality of first regions on the first electrode plate comprises:

the first electrode plate passing through between the fast roller and the laminating roller to coat lithium in the first regions on the fast roller onto the second regions corresponding to the first regions on the first electrode plate.

18. The lithium supplementing method according to claim 12, wherein at least part of second regions among the plurality of second regions have different widths in the first direction.

19. The lithium supplementing method according to claim 12, further comprising:

by means of a plurality of winding devices, respectively winding the plurality of second electrode plates after being subjected to lithium supplementing.

* * * * *